(12) United States Patent
Huber et al.

(10) Patent No.: US 10,907,990 B2
(45) Date of Patent: Feb. 2, 2021

(54) SENSOR DEVICE FOR MEASURING A LINEAR OR ROTATIONAL MOVEMENT OF A MEASUREMENT OBJECT

(71) Applicant: KNORR-BREMSE SYSTEME FUER NUTZFAHRZEUGE GMBH, Munich (DE)

(72) Inventors: Christian Huber, Munich (DE); Stefan Prams, Munich (DE)

(73) Assignee: KNORR-BREMSE SYSTEME FUER NUTZFAHRZEUGE GMBH, Munich (DE)

(*) Notice: Subject to any disclaimer, the term of this patent is extended or adjusted under 35 U.S.C. 154(b) by 35 days.

(21) Appl. No.: 16/342,293

(22) PCT Filed: Oct. 17, 2017

(86) PCT No.: PCT/EP2017/076472
§ 371 (c)(1),
(2) Date: Apr. 16, 2019

(87) PCT Pub. No.: WO2018/073247
PCT Pub. Date: Apr. 26, 2018

(65) Prior Publication Data
US 2019/0257670 A1 Aug. 22, 2019

(30) Foreign Application Priority Data
Oct. 19, 2016 (DE) .................. 10 2016 119 881

(51) Int. Cl.
*G01D 5/14* (2006.01)
*F16D 11/14* (2006.01)
*F16D 11/00* (2006.01)

(52) U.S. Cl.
CPC ............. *G01D 5/145* (2013.01); *F16D 11/00* (2013.01); *F16D 11/14* (2013.01)

(58) Field of Classification Search
None
See application file for complete search history.

(56) References Cited

U.S. PATENT DOCUMENTS 3,806,215 A * 4/1974 Price .................... F16C 35/073
  384/538
4,901,014 A   2/1990 Riegger et al.
(Continued)

FOREIGN PATENT DOCUMENTS

DE     4309027 A1   9/1994
DE   102011116910 A1   4/2013
(Continued)

OTHER PUBLICATIONS

International Search Report dated Jan. 24, 2018, of the corresponding International Application PCT/EP2017/076472 filed Oct. 17, 2017.

*Primary Examiner* — Jas A Sanghera
(74) *Attorney, Agent, or Firm* — Norton Rose Fulbright US LLP; Gerard Messina

(57) ABSTRACT

A sensor for measuring a linear/rotating movement (LRM) of a measurement object (MO): one sensor element (SE) to detect the LRM of the MO and emit measuring signals (MS), the sensor element having encoder element (EE) and sensitive element (SeE), the SE detecting a relative movement between the EE and SeE; an electronic evaluator to evaluate the MS of the SE; a first shaft (FS) coupled to the EE by a bearing; a second shaft (SS) coupled to the MO by a bearing; the FS/SS, by a releasable connection, are mutually coupled for rotation coaxially; the bearing has central axis (CA) and cylindrical bearing face (CBF) in the axial direction (AD) parallel with the CA has an axial extent (AE), and in the radial direction (RD) perpendicular to the CA has a bearing face (BF) internal diameter (ID); the connection has a "first axial"/"radial toothing" (FT) on one FS end, and a "second (Continued)

axial"/"radial toothing" (ST) on one SS end, the FT/ST mutually engaging form-fittingly; the connection in the RD is within the BF ID, and in the AD is within the AE of the BF; and the FS by another end facing away from the FT, and the SS by another end facing way from the ST, protrude axially from the BF.

12 Claims, 1 Drawing Sheet

(56) References Cited

U.S. PATENT DOCUMENTS

| | | | | |
|---|---|---|---|---|
| 2003/0001565 | A1* | 1/2003 | Hoekstra | G01D 5/145 |
| | | | | 324/207.21 |
| 2011/0089936 | A1* | 4/2011 | Putinier | G01D 5/2452 |
| | | | | 324/207.25 |
| 2012/0187942 | A1* | 7/2012 | Lee | G01D 5/24442 |
| | | | | 324/207.25 |
| 2016/0141940 | A1* | 5/2016 | Hager | H02K 11/215 |
| | | | | 403/341 |

FOREIGN PATENT DOCUMENTS

| | | |
|---|---|---|
| DE | 102013219017 A1 | 6/2014 |
| EP | 0943469 A2 | 9/1999 |
| JP | H05187456 A | 7/1993 |
| WO | 2004035364 A1 | 4/2004 |

* cited by examiner

SENSOR DEVICE FOR MEASURING A LINEAR OR ROTATIONAL MOVEMENT OF A MEASUREMENT OBJECT

FIELD OF THE INVENTION

The invention proceeds from a sensor installation for measuring a linear or rotating movement of a measurement object.

BACKGROUND INFORMATION

Such sensor installations are used, for example, for measuring linear or rotating movements of moving vehicle elements, for example for measuring an activation angle of a vehicle pedal.

SUMMARY OF THE INVENTION

The present invention is based on the object of refining a sensor installation of the type mentioned at the outset in such a manner that the service life of said sensor installation is as long as possible.

The object may be achieved according to the invention by the features described herein.

The invention proposes a sensor installation for measuring a linear or rotating movement of a measurement object, including at least a) one sensor element which is disposed and configured for detecting directly or indirectly the linear or rotating movement of the measurement object and for emitting corresponding measuring signals, wherein the sensor element has an encoder element and a sensitive element, and the sensor element detects a relative movement between the encoder element and the sensitive element;

b) an electronic evaluation installation which is configured for evaluating the measuring signals of the sensor element;

c) a first shaft which is coupled to the encoder element of the sensor element and is mounted by a bearing installation;

d) a second shaft which is coupled directly or indirectly to the measurement object and is at least radially mounted by the bearing installation; wherein e) the first shaft and the second shaft by a releasable connection are mutually coupled for rotation in a coaxial manner; and wherein f) the bearing installation has a central axis and a cylindrical bearing face which in the axial direction parallel with the central axis has an axial extent, and in the radial direction perpendicular to the central axis has a bearing face internal diameter; and wherein g) the connection has a first axial and/or radial toothing which is configured on one end of the first shaft; and a second axial and/or radial toothing which is configured on one end of the second shaft, wherein the first toothing and the second toothing mutually engage in a form-fitting manner; and that h) the connection when viewed in the radial direction is disposed within the bearing face internal diameter, and when viewed in the axial direction is disposed within the axial extent of the bearing face; wherein i) the first shaft by way of the other end thereof that faces away from the first toothing, and the second shaft by way of the other end thereof that faces way from the second toothing, protrude in each case axially from the bearing face.

The connection can therefore lie in that both the first shaft as well as the second shaft have in each case an axial toothing or in have in each case a radial toothing, or in have each case a combined radial/axial toothing. An axial toothing means that teeth are in each case disposed so as to be uniformly distributed on a circumferential periphery of an end face of the one end of the first shaft and of the second shaft and then engaging one another. A radial toothing means that teeth are in each case disposed so as to be uniformly distributed on an external circumferential face on the one end of the first shaft and on an internal circumferential face on the one end of the second shaft, said toothing in the manner of a multiple-groove profile or of a serrated profile then engaging in one another. Conversely, teeth can in each case be also disposed so as to be uniformly distributed on a radially inward circumferential face on the one end of the first shaft and on a radially outward circumferential face on the one end of the second shaft, so as to then engage in one another.

In any case, a rotationally fixed form-fit between the first toothing and the second toothing is created. Therefore, a rotating movement of the second shaft that is coupled directly or indirectly to the measurement object is therefore transmitted in a rotationally fixed manner to the first shaft on account of the form-fit between the first toothing and the second toothing.

Not only a rotating movement of the measurement object coupled to the second shaft is mandatorily detected herein by the sensor installation. Rather, the sensor installation can also detect a linear movement of the measurement object when said linear movement by a gear mechanism is converted to a rotating movement of the second shaft.

The first toothing and the second toothing are configured so as to be complimentary, that is to say that the teeth of said toothings having each case the same mutual spacing and can engage in one another in a form-fitting manner. Any geometric cross section of a toothing is conceivable herein, also angular or rounded cross sections, for instance.

The connection, when viewed in the radial direction, being disposed within the bearing face internal diameter and, when viewed in the axial direction, being disposed within the axial extent of the bearing face, means that the first toothing as well as the second toothing, when viewed in the radial direction, is disposed completely within the bearing face internal diameter and, when viewed in the axial direction, is disposed completely within the axial extent of the bearing face. In other words, the rotationally fixed connection embodied as a radial and/or as an axial toothed connection in this instance in spatial terms is disposed completely within the bearing face of the bearing installation, when viewed in the axial as well as in the radial direction. The connection in this instance represents a rotating component part at least of a radial mounting of the first shaft and of the second shaft in the bearing installation, the stationary component thereof being the bearing face of the bearing installation.

The bearing face is formed, for example, by a radially inward bearing shell of a friction bearing, or by an internal ring of a roller bearing, wherein the friction bearing or the roller bearing in this instance enables a rotation of the first shaft and of the second shaft, the latter by the connection being connected to the first shaft in a form-fitting and rotationally fixed manner, in relation to a bearing point which is disposed, for example, in or on a housing of the sensor installation.

On account thereof, there is the advantage that the connection installation is at least radially supported and on account stabilized by the bearing face of the bearing installation, on the one hand. Furthermore, the connection in this instance lies in a region of lower and more homogenous mechanical stress, this being advantageous in terms of the breaking load and the mechanical wear. Not least, the connection is in this instance is also better protected in relation to environmental influences such as moisture and contamination.

Advantageous refinements and improvements of the invention are possible by way of the measures set forth herein.

A sleeve may be disposed between the bearing shell, or the bearing face internal diameter, respectively, on the one hand, and an external diameter of the first shaft, or the first shaft and the second shaft, or an external diameter of the second shaft, respectively, on the other hand. The material of such a sleeve in this instance can be adapted with a view to rigidity and bearing properties. The sleeve herein can be loose, can conjointly rotate with the first and the second shaft, or be connected to the bearing face.

A particularly good support of the connection by the bearing face results when the external diameter of the first shaft and the external diameter of the second shaft may be identical, at least in the region of the connection.

According to one refinement, the connection can include at least one axial connection element which mutually connected in an axial manner the first shaft and the second shaft. The connection element may be formed by a screw which, for example, protrudes through a central axial passage opening of the second shaft and is screwed into a central threaded bore configured at the one end of the first shaft on which the first toothing is configured.

The sensor element conjointly with the evaluation installation is in particular configured for measuring a rotation angle and/or a rotating speed and/or a rotating acceleration of the first shaft.

The bearing installation, or the bearing face, respectively, may particularly be disposed in a passage opening of a housing of the sensor installation, the second shaft protruding from the outside axially into said passage opening, wherein the second shaft is disposed within the housing. The electronic evaluation installation of the sensor installation may be also disposed within the housing.

According to one refinement, the bearing face is disposed in the passage opening of the housing, or is supported by said passage opening, for example in the case in which the bearing face represents a bearing shell of a friction bearing or an internal ring of a roller bearing. Alternatively, the bearing face can also be formed by a radially inward circumferential face of the passage opening per se.

The sensor element can in particular include a Hall element by way from which an encoder, for example as a magnet, that rotates conjointly with the first shaft leads out in this instance, said encoder rotating in relation to a stationary Hall chip that is disposed in the housing, the latter in this instance representing the sensitive element.

The sensor installation may furthermore be a component part of a closed-loop level control and is configured for measuring the level of a superstructure in relation to a running gear of an air-sprung vehicle, wherein the superstructure represents the measurement object, and the second shaft is connected to a lever that is articulated on the superstructure. The lever in this instance is part of a gear mechanism which converts the change in the level of the superstructure to her corresponding rotating movements of the lever. The rotating movement of the lever which then by the connection is transmitted in a rotationally fixed manner to the first shaft and is detected by the sensor element in this instance represents a measure for the change in the level of the superstructure.

The invention also relates to a vehicle having a sensor installation described above. In this case, the vehicle can have an electronic control apparatus which, depending on the sensor signals generated by the electronic evaluation installation, based on the measuring signals actuates at least one actuator, in particular an electro-pneumatic valve installation for aerating or ventilating air-spring bellows of an air-spring installation in the context of the closed-loop level control.

Advantageous refinements of the invention are derived from the patent claims, the description and the drawings. The advantages of features and combinations of a plurality of features mentioned in the introduction to the description are merely exemplary and can become effective in an alternative or cumulative manner without the advantages having to be mandatorily achieved by embodiments according to the invention.

Further features can be derived from the drawings—in particular the illustrated geometries and the relative dimensions of a plurality of components with respect to one another and the relative assembly and operative connection thereof. The combination of features of different embodiments of the invention or of features of different patent claims is also possible in a way which differs from the selected back-references of the patent claims, and this is suggested herewith. This also relates to such features which are illustrated in separate drawings or specified in the description thereof. These features can also be combined with features of different patent claims. Likewise, features for further embodiments of the invention which are specified in the patent claims can also be omitted.

Identical components and functional groups, or functionally equivalent components and functional groups, respectively, are in each case identified by the same reference signs in different embodiments.

An exemplary embodiment of the invention is illustrated hereunder and is explained in more detail in the following description.

DETAILED DESCRIPTION

Figure 1:
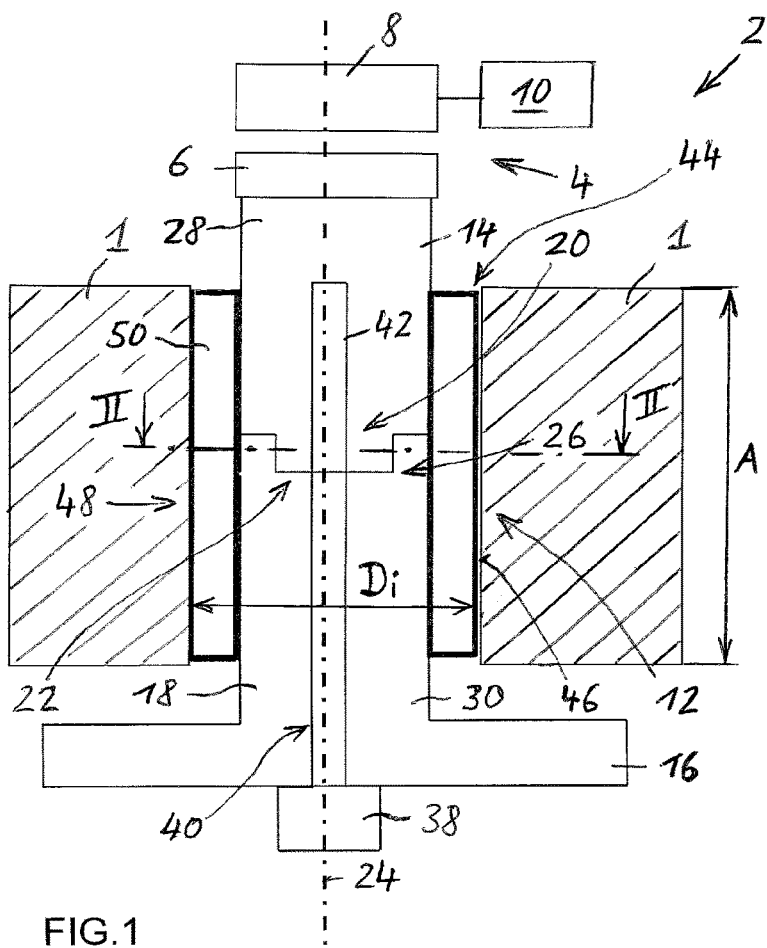
FIG. 1 shows a highly schematic cross-sectional illustration through a housing of a sensor installation according to one embodiment of the invention.

A highly schematic cross-sectional illustration through a housing 1 of a sensor installation 2 according to one embodiment of the invention is shown in FIG. 1, wherein the sensor installation 2 is, for example, a component part of a closed-loop level control (not shown for reasons of scale), said closed-loop level control apart from the sensor installation 2 including an electronic control apparatus as well as an electro-pneumatic valve installation for aerating or venting air-spring bellows of an air-spring installation which is disposed between a superstructure and a running gear of a vehicle, in particular a commercial vehicle.

The sensor installation 2 for example here in this instance serves for feeding a signal which represents the current actual level of the superstructure in relation to the running gear to the electronic control apparatus in order for an actuator signal to be generated therein by a nominal/actual value comparison, said actuator signal being for the electro-pneumatic valve installation, so as to establish the desired nominal level by aerating or venting the air-spring bellows. Such a closed-loop level control in an air-spring installation is well known. Therefore, no further reference thereto is to be made here.

The sensor installation 2 comprises a sensor element 4, here a Hall element, for example, wherein the sensor element has an encoder element 6 and a sensitive element 8, and the sensor element 4 detects a relative movement between the encoder element 6 and the sensitive element 8.

The sensor installation 2 furthermore comprises an electronic evaluation installation 10 which is configured for evaluating the measuring signals of the sensor element 4, as well as a first shaft 14 that is coupled in a rotationally-fixed manner to the encoder element 6 of the sensor element 4 and is rotatably mounted in the housing 1 by a bearing installation 12, and a second shaft 18 that is coupled to the superstructure of the vehicle, here for example by way of a lever 16 of a lever mechanism, and is rotatably mounted by the bearing installation 12.

One end 20 of the first shaft 14 and one end 22 of the second shaft 18 herein, in relation to a rotating or central axis 24 that is common to the bearing installation 12, are disposed so as to be coaxial and are mutually coupled in a rotationally fixed manner by a releasable connection 26. The external diameter of the first shaft 14 and the external diameter of the second shaft 18 may be identical, at least in the region of the releasable connection 26, that is to say in the region of the one ends 20, 22 of the first shaft 14 and the second shaft 18.

The encoder element 6 of the sensor element 4, for example in the form of a magnet, is disposed on the other end 28 of the first shaft 14, said other end 28 pointing away from the one end 20. Furthermore, the lever 16 is connected in a rotationally fixed manner to the other end 30 of the second shaft 18, said other end 30 pointing away from the one end 22.

Figure 2:
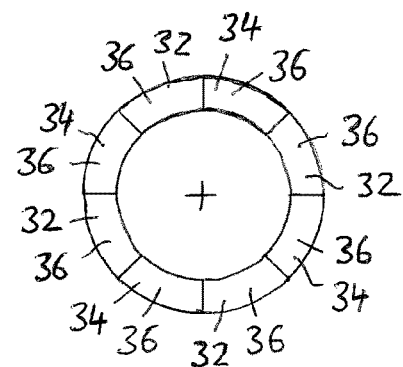
FIG. 2 shows a cross-sectional illustration along the line II-II of FIG. 1.

The releasable connection 26 includes a first, for example axial, toothing 32 that is configured on the one end 20 of the first shaft 14, and a second, for example axial, toothing 34 that is configured on the one end 22 of the second shaft 18, wherein the first axial toothing 32 and the second axial toothing 34 are configured so as to be complementary and engage in one another in a form-fitting manner. As can best be seen by FIG. 2 which represents a cross-sectional illustration of FIG. 1 along the line II-II, teeth 36 are in each case disposed so as to be uniformly distributed on a circumferential periphery of an end face of the one end 20 of the first shaft 14 and the one end 22 of the second shaft 18, said teeth 36 engaging in one another. The end faces of the two shaft 14, 18 on which teeth 36 are in each case disposed lie so as to be mutually opposite.

The form-fit between the two axial toothings 32, 34 here is ensured, for example, in that a screw 38 protrudes through a central axial passage opening 40 in the second shaft 18 and is screwed into a central threaded bore 42 that is configured on the one end 20 of the first shaft 14, the first axial toothing 32 being configured on said one end 20.

The first shaft 14 in this instance, by way of the other end 28 thereof that points away from the first axial toothing 32, and the second shaft 18 by way of the other end 30 thereof that points away from the second axial toothing 34, point axially out of a bearing face 46 of the bearing installation 12 which is disposed or held in a passage opening 44 of the housing 1.

The bearing face 46 here is formed, for example, by a radially inward bearing shell of a friction bearing 48 which is held in a rotationally fixed and axially fixed manner in the passage opening 44 of the housing 1. The first shaft 14 and the second shaft 18, as well as the connection 26 thereof, conjointly form the other partner of the friction bearing in this instance. The friction bearing 48 in this instance enables a rotation of the first shaft 14 and of the second shaft 18, the latter by the connection 26 being connected in a form-fitting and rotationally fixed manner to said first shaft 14, in relation to a bearing point which is disposed in the passage opening 44 of the housing 1 of the sensor installation 2. The bearing face 46, or the radially inward bearing shell of the friction bearing 48 here, respectively, is disposed in a radially inward circumferential face of the passage bore 44 or is supported by the latter. The bearing face 46, here in particular the radially inward bearing shell of the friction bearing 48, has a bearing face internal diameter Di as well as, when viewed in the axial direction, an axial extent A which here is substantially exactly the same size as the axial extent of the passage opening 44 in the housing 1, for example.

The releasable connection 26 in the form of the toothings 32, 34 of the first shaft 14 and of the second shaft 18 that axially engage in one another, when viewed in the radial direction, is disposed within the bearing face internal diameter Di, in the present case the bearing shell internal diameter Di, and when viewed in the axial direction is disposed within the axial extent A of the bearing face 46.

Furthermore, a sleeve 50 can be disposed between the bearing face 46, on the one hand, and the first shaft 14 and the second shaft 18, on the other hand, in the region of the connection 26. The sleeve 50 herein can be loose, can conjointly rotate with the first and the second shaft 14, 18, or be connected to the bearing face 46 in a rotationally fixed and/or axially fixed manner. The first shaft 14 and the second shaft 18 can be additionally axially mounted by an axial bearing (not shown here).

Instead of being formed by axial toothings 32, 34 as described here, the connection can however also be formed by a pure radial toothing or a combined axial/radial toothing. A radial toothing means that teeth are in each case disposed so as to be uniformly distributed on an external circumferential face on the one end 20 of the first shaft 14 and on an internal circumferential face on the one end 22 of the second shaft 18, said teeth in the manner of a multiple-groove profile or of a serrated profile then engaging in one another. Conversely, teeth can in each case also be disposed so as to be uniformly distributed on a radially inward circumferential face on the one end 20 of the first shaft 14 and on a radially outward circumferential face on the one end 22 of the second shaft 18, so as to then engage in one another.

The LIST OF REFERENCE SIGNS is as follows:
1 Housing
2 Sensor installation
4 Sensor element
6 Encoder element
8 Sensitive element
10 Evaluation installation
12 Bearing installation 14 First shaft
16 Lever
18 Second shaft
20 One end
22 One end
24 Central axis
26 Connection
28 Other end
30 Other end
32 First toothing
34 Second toothing
36 Teeth
38 Screw
40 Passage opening
42 Threaded bore
44 Passage opening
46 Bearing face
48 Friction bearing
50 Sleeve

The invention claimed is:

1. A sensor installation for measuring a linear or rotating movement of a measurement object, comprising:
   a) one sensor element disposed to detect directly or indirectly the linear or rotating movement of the measurement object and for emitting corresponding measuring signals, wherein the sensor element has an encoder element and a sensitive element, and wherein the sensor element detects a relative movement between the encoder element and the sensitive element;
   b) an electronic evaluation installation to evaluate the measuring signals of the sensor element;
   c) a first shaft coupled to the encoder element of the sensor element and mounted by a bearing installation;
   d) a second shaft coupled directly or indirectly to the measurement object and mounted by the bearing installation;
   wherein:
   e) the first shaft and the second shaft, by a releasable connection, are mutually coupled for rotation in a coaxial manner;
   f) the bearing installation has a central axis and a cylindrical bearing face which in the axial direction parallel with the central axis has an axial extent, and in the radial direction perpendicular to the central axis has a bearing face internal diameter;
   g) the connection has a first axial and/or radial toothing on one end of the first shaft, and a second axial and/or radial toothing on one end of the second shaft, wherein the first toothing and the second toothing mutually engage in a form-fitting manner;
   h) the connection when viewed in the radial direction is disposed within the bearing face internal diameter, and when viewed in the axial direction is disposed within the axial extent of the bearing face; and
   i) the first shaft by the other end thereof that faces away from the first toothing, and the second shaft by the other end thereof that faces way from the second toothing, protrude in each case axially from the bearing face,
   wherein the connection includes at least one axial connection element which mutually connects in an axial manner the first shaft and the second shaft, and
   wherein the connection element includes a screw.

2. The sensor installation of claim 1, wherein a sleeve is disposed between the bearing face, and the first shaft and the second shaft.

3. The sensor installation of claim 1, wherein the external diameter of the first shaft and the external diameter of the second shaft are identical, at least in a region of the connection.

4. The sensor installation of claim 1, wherein the bearing face is formed by a radially inward bearing shell of a friction bearing, or by an internal ring of a roller bearing.

5. The sensor installation of claim 1, wherein the sensor element conjointly with the evaluation installation is for measuring a rotation angle, a rotating speed and/or a rotating acceleration of the first shaft.

6. The sensor installation of claim 1, wherein the bearing installation is disposed in a passage opening of a housing of the sensor installation, the second shaft protruding from the outside axially into the passage opening, and wherein the second shaft is disposed within the housing.

7. The sensor installation of claim 6, wherein the electronic evaluation installation is disposed within the housing.

8. The sensor installation of claim 6, wherein the bearing face is disposed in the passage opening of the housing, or is supported by the passage opening.

9. The sensor installation of claim 1, wherein the sensor element includes a Hall effect element.

10. The sensor installation of claim 1, wherein the sensor installation is configured for measuring the level of a superstructure in relation to a running gear of an air-sprung vehicle, and wherein the superstructure represents the measurement object, and the second shaft is connected to a lever that is articulated on the superstructure.

11. A vehicle, comprising:
   a sensor installation for measuring a linear or rotating movement of a measurement object, including:
      a) one sensor element disposed to detect directly or indirectly the linear or rotating movement of the measurement object and for emitting corresponding measuring signals, wherein the sensor element has an encoder element and a sensitive element, and wherein the sensor element detects a relative movement between the encoder element and the sensitive element;
      b) an electronic evaluation installation to evaluate the measuring signals of the sensor element;
      c) a first shaft coupled to the encoder element of the sensor element and mounted by a bearing installation;
      d) a second shaft coupled directly or indirectly to the measurement object and mounted by the bearing installation;
   wherein:
      e) the first shaft and the second shaft, by a releasable connection, are mutually coupled for rotation in a coaxial manner;
      f) the bearing installation has a central axis and a cylindrical bearing face which in the axial direction parallel with the central axis has an axial extent, and in the radial direction perpendicular to the central axis has a bearing face internal diameter;
      g) the connection has a first axial and/or radial toothing on one end of the first shaft, and a second axial and/or radial toothing on one end of the second shaft, wherein the first toothing and the second toothing mutually engage in a form-fitting manner;
      h) the connection when viewed in the radial direction is disposed within the bearing face internal diameter, and when viewed in the axial direction is disposed within the axial extent of the bearing face; and i) the first shaft by the other end thereof that faces away from the first toothing, and the second shaft by the other end thereof that faces way from the second toothing, protrude in each case axially from the bearing face, wherein the connection includes at least one axial connection element which mutually connects in an axial manner the first shaft and the second shaft, and wherein the connection element includes a screw.

12. The vehicle of claim 11, further comprising:

an electronic control apparatus which, depending on sensor signals generated by the electronic evaluation installation, actuates at least one actuator based on the measuring signals.

\* \* \* \* \*